3,184,518
INCREASED EFFICIENCY IN MOLECULAR SIEVE
ADSORPTION SYSTEM
William W. Sanders, Crete, Ill., and Herbert G. Krane, Gary, and William F. Pansing, Munster, Ind., assignors to Standard Oil Company, Chicago, Ill., a corporation of Indiana
Filed Aug. 22, 1960, Ser. No. 50,955
3 Claims. (Cl. 260—676)

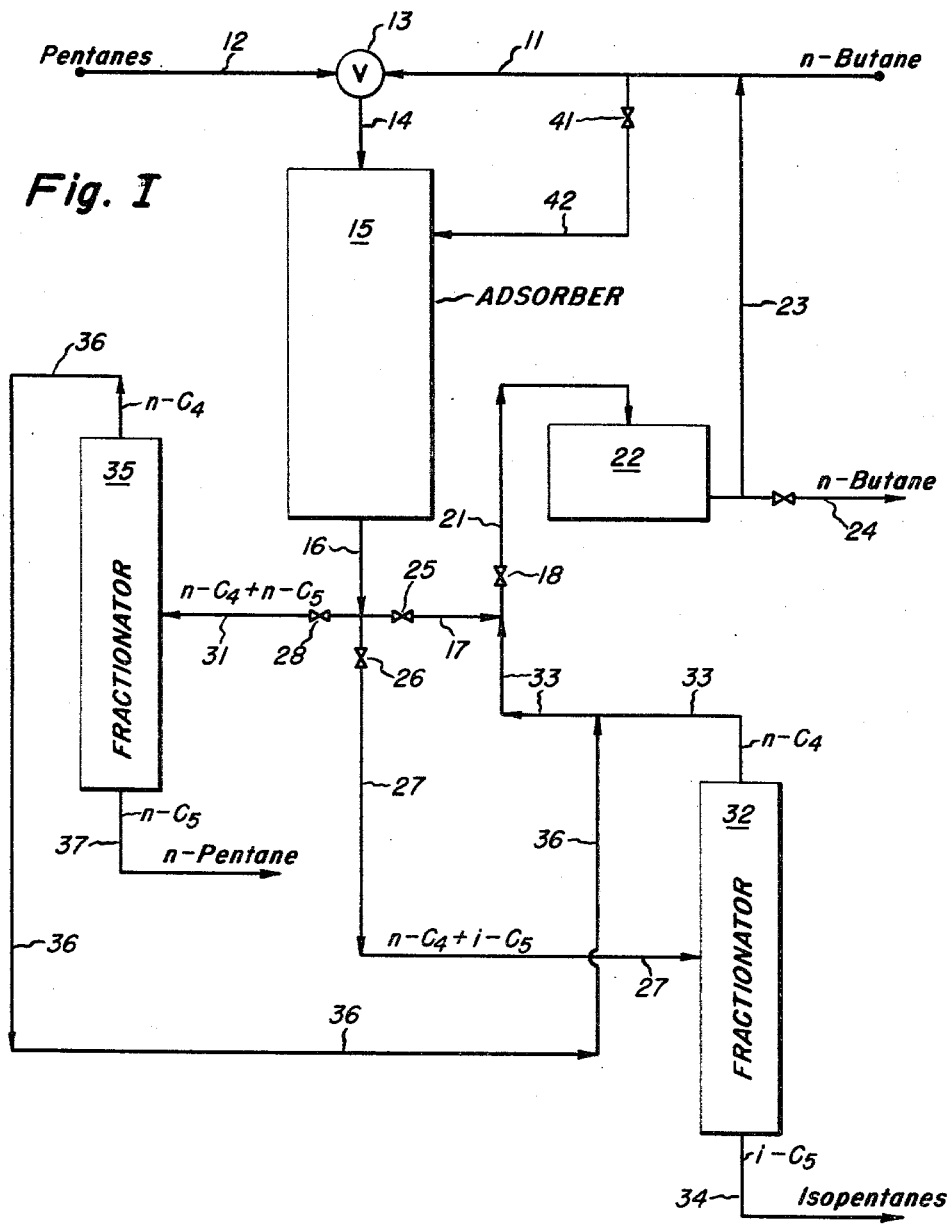
Fig. I
INVENTORS:
William W. Sanders
Herbert G. Krane
William F. Pansing
BY
ATTORNEY

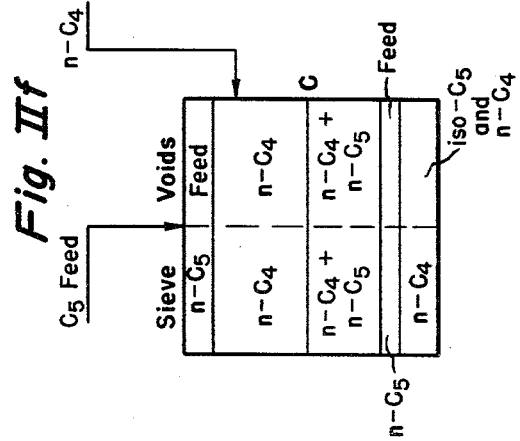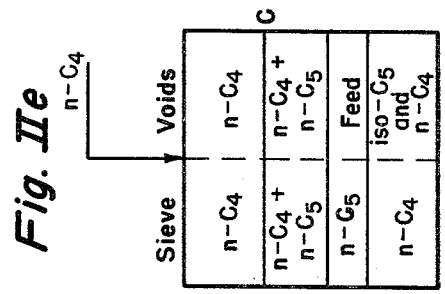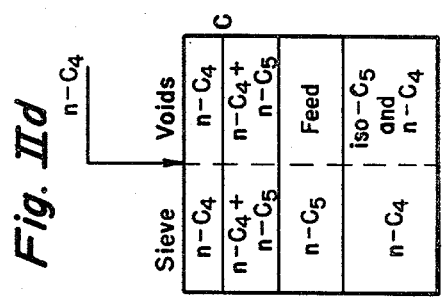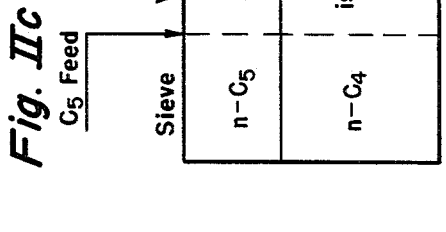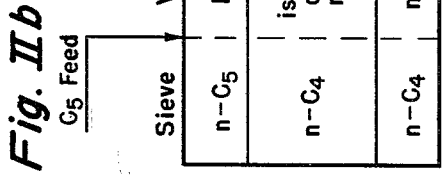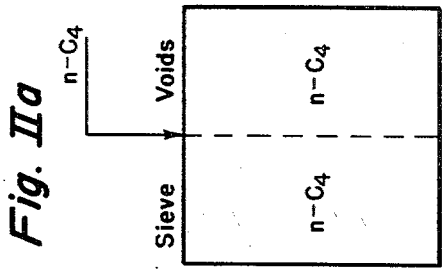

This invention relates to improvements in the separation of hydrocarbons by adsorption on molecular sieve adsorbent materials. More particularly, this invention relates to such improvements wherein a bed of molecular sieve adsorbent material is used for adsorption and wherein the amount of bed actively utilized in mass transfer may be increased.

In the separation of hydrocarbons using molecular sieve adsorbent beds, a mixture of hydrocarbons of diverse molecular types is charged through the bed and the adsorbable hydrocarbons are adsorbed on the adsorbent surfaces of the bed. The molecular sieve adsorbents function in a highly selective manner in differentiating between hydrocarbons of different types by pore sizes included within the adsorbent material. Molecular sieve adsorbents contain pores of varying sizes depending upon the adsorbent. The pores act as routes of access to the greater adsorptive surfaces of the molecular sieve material. The pore size acts to permit access by hydrocarbons of certain structures while excluding other hydrocarbon types from the adsorptive surfaces. For example, a molecular sieve having pore sizes of about 5 A. will permit passage therethrough of straight-chain hydrocarbons while excluding branched-chain and cyclic hydrocarbons. The molecular diameter of the straight-chain is less than 5 A. while branching or cyclization of the chain increases the diameter and creates larger molecules which are too large to pass through the 5 A. pore. Thus, the straight-chain hydrocarbon is selectively adsorbed. Other hydrocarbons may also be separable using molecular sieve adsorbent materials having the desired pore size, e.g., see U.S. 2,306,610, R. M. Barrer, patented December 29, 1942.

In the utilization of molecular sieves for separation of hydrocarbons of different types, it has recently been common practice to use two or more beds of molecular sieve material used in a cyclic fashion. Accordingly, one bed may conveniently be used for adsorption of the adsorbable hydrocarbon while the other bed is undergoing desorption, e.g., by displacement, evacuation or reduction in pressure, increase in temperature, or by stripping with a purge gas, to remove the adsorbed hydrocarbon or by flow through the bed in a direction countercurrent to the normal adsorption direction of flow.

The process of this invention is an improved method of utilizing molecular sieve adsorbents in the separation of hydrocarbons of diverse molecular structure. The method of this invention is operable using only one bed and adsorption and desorption take place simultaneously within the same bed of molecular sieve adsorbent. In accordance with the method of this invention, a plurality of different boiling feed materials, each containing an adsorbable hydrocarbon, are flowed in consecutive order and in the same direction through a bed of molecular sieve adsorbent material whereby the adsorbable hydrocarbon of each is alternatingly adsorbed on a given portion of the bed. The feeds are alternatingly flowed through the bed in order to provide the alternating adsorption of different boiling adsorbable hydrocarbons. The adsorbable hydrocarbon of each feed displaces the adsorbed hydrocarbon of another feed, i.e., the next previous feed, by mass transfer whereby the adsorbable hydrocarbon in the feed being flowed through the molecular sieve bed becomes adsorbed. The flow rate of each feed through the bed is controlled at a rate permitting the creation and maintenance of a mass transfer front preceding each of the feeds through the bed. The rate of alternating the feeds, i.e., changing from one feed to the next, is controlled so that as to provide charging of one feed to the bed subsequent to another feed before the mass transfer front preceding the other feed passes completely through the length of the bed. Thus, a new feed is charged to the bed prior to completion of desorption by displacement by the next prior feed. The feeds may advantageously be continuously alternated through the bed to provide continuous simultaneous adsorption and desorption in the bed.

In discussing the process of this invention herein, the plurality of feeds will be referred to as two feeds and discussions of the applicability of the process and embodiments thereof will hereinafter be set forth with respect to two feeds. However, it is to be understood that three or more feeds may be used herein by alternatingly flowing such feeds through the bed in any order desired.

In the process of this invention, each feed acts as a displacement fluid for displacing the adsorbed hydrocarbons from the prior feed material. In one embodiment of this invention, a stream of substantially rich or high power adsorbable hydrocarbon may be used as one feed. Although such a stream might more particularly be referred to as a displacement fluid because little or no separation of adsorbable hydrocarbons from unadsorbable hydrocarbons would occur in the absence of unadsorbable hydrocarbons in this feed material, the high purity adsorbable hydrocarbon will herein be considered as a feed material for the sake of simplicity. A desorption fluid which desorbs by displacement is within the terminology "feed" or "feed material" because such desorption fluid is in fact a feed which is passed through the bed of molecular sieve adsorbent. However, both feeds alternatingly charged through the bed cannot be high purity adsorbable hydrocarbons as will be seen hereinbelow.

The process of this invention utilizing simultaneous adsorption and desorption within a single bed may be carried out in either the liquid or vapor phase.

In one embodiment of this invention, the process includes the additional step, where one of the feeds is a high purity adsorbable hydrocarbon, i.e., a displacement fluid, of charging the high purity adsorbable hydrocarbon feed from the side of the adsorption zone behind the mass transfer front setup by charging the high purity adsorbable hydrocarbon feed into the bed from the inlet end. The additional charging of this feed from the side of the adsorption zone or bed permits faster alternating of feeds charged to the bed in that the other feed material, i.e., the one to be separated, may immediately be charged through the inlet while the high purity adsorbable hydrocarbon feed is being charged through the side of the bed and into the area behind the mass transfer front of the high purity adsorbable hydrocarbon feed and in front of the mass transfer front of the other feed being charged at the inlet.

In another preferred embodiment of this invention, the zone of each separable feed charged through the bed of molecular sieve material is permitted to disappear from the void spaces around the molecular sieve material by adsorption of adsorbable hydrocarbons therefrom in through the pore openings in the sieve material. By separable hydrocarbon feed is meant a feed which contains adsorbable and unadsorbable hydrocarbons. The feed zone traveling through the bed is said to have disappeared when no zone having the same composition as the feed material remains in the bed. Adsorption from each feed at the mass transfer front and the thickness of the feed zone traveling through the bed is thereby decreased and ultimately disappears before the feed zone reaches the outlet end of the bed.

The molecular sieve adsorbent materials which may be used are those molecular sieve adsorbents which separate hydrocarbons in accordance with their molecular cross-sectional sizes as discussed hereinabove. The molecular sieve materials include natural zeolites and synthetic zeolites having rigid 3-dimensional anionic networks and having pores sufficiently large to adsorb the desired adsorbable hydrocarbon and sufficiently small to exclude hydrocarbons having larger molecules. The molecular sieve adsorbents are particularly useful in separating straight-chain hydrocarbons from branched-chain or cyclic hydrocarbons and, thus, it is particularly desirable that the pore sizes of the molecular sieve material be sufficiently large to adsorb the straight-chain hydrocarbons but sufficiently small to exclude the branched-chain and/or cyclic hydrocarbons.

The natural zeolites which may be employed include naturally occurring chabazite, phacolite, gmelinite, harmotome, and the like, or suitable modifications of these produced by base exchange. The synthetic zeolites which may be employed are generally synthetic crystalline partially dehydrated metallo-alumina silicates provided with pores of uniform size due to the crystalline structure. The synthetic zeolites include the sodium-alumina silicates and calcium-alumina silicates. They may be prepared by heating stoichiometric quantities of alumina and silica in excess caustic under pressure. The excess caustic material is then washed out and a different metal ion may be introduced by ion exchange to form the molecular sieves of different pore sizes depending on the metal ion introduced. Examples of such synthetic molecular sieves are Linde Molecular Sieve Type 4A and Type 5A. Such synthetic molecular sieves are available commercially and have pore sizes of about 4 A or 5 A as indicated by the nomenclature of the sieve material. The Linde sieves are marketed by Linde Company, Division of Union Carbide Corp.

The feed materials may be those hydrocarbon feed materials normally separable by molecular sieve adsorption. At least one of the feed materials employed is such a feed material normally separable by adsorption on molecular sieves. The other feed material is a different boiling hydrocarbon feed material and may be a feed material normally separable by molecular sieve adsorption or may be a high purity adsorbable hydrocarbon, as discussed above. The feed materials normally separable by molecular sieve adsorption include mixtures of straight-chain hydrocarbons with nonstraight-chain hydrocarbons and such feeds containing straight-chain hydrocarbons are advantageously separable in accordance herewith. The two feeds are of differing boiling ranges and herein may be referred to as a heavy feed and a light feed; the heavy feed and light feed are alternatingly charged to the sieve bed from the same end thereof and pass through the sieve bed in the same direction. The straight-chain hydrocarbons which are present in both feeds to achieve displacement at the mass transfer front are the normal paraffinic and normal olefinic hydrocarbons including normal di-olefins and the like. The nonstraight-chain hydrocarbons which are contained in at least one feed and which may be contained in both feeds are the isoparaffinic hydrocarbons, isoolefinic hydrocarbons, cyclo paraffinic hydrocarbons, aromatic hydrocarbons, alkylated aromatic hydrocarbons and the like. The straight-chain hydrocarbons of the feeds may contain from about one to about 18 carbon atoms and preferably contain from about 2 to about 14. The feed materials may advantageously be obtained from fractionating a mixture of hydrocarbons containing straight-chain hydrocarbons into a higher boiling fraction and a lower boiling fraction, each fraction containing straight-chain hydrocarbons. The higher-boiling fraction and the lower boiling fraction may be used as the two alternating feeds to the molecular sieve bed in a single separation process. Examples of mixtures of hydrocarbons which may be fractionated to provide the two feeds for use in this process are virgin and cracked naphthas, reformer effluents, isomerization effluents, and other petroleum fractions.

Typical feeds which may be employed as either or both feeds in this process are mixtures of butane and isobutane, n-pentane and isopentane, n-hexane and isohexane, n-octane and isooctane, n-dodecane and isododecane, mixtures of aromatic and normal paraffinic hydrocarbons boiling in the $C_5$ to $C_6$ range and mixtures of aromatic and normal paraffinic hydrocarbons boiling in the $C_7$ to $C_{10}$ range, and the petroleum fractions described above.

Where it is desired to use a feed consisting of a high purity adsorbable hydrocarbon, any adsorbable hydrocarbon such as a high purity straight-chain hydrocarbon may be used. Such adsorbable straight-chain hydrocarbons are, for example, ethylene, propane, n-butane, n-butylene, n-pentane, n-hexane, n-octadecane, n-dodecane, etc.

Because of the very high selectivity of molecular sieves for straight-chain hydrocarbons, it is preferred that the adsorbable hydrocarbon to be separated from a given feed be a straight-chain hydrocarbon. Further, the high selectivity of the sieve material makes it possible to separate straight-chain hydrocarbons of very low concentration from admixture with nonstraight-chain hydrocarbons. Thus, there is no minimum or maximum concentration of adsorbable or unadsorbable components in the feed materials for use in the preferred operation of the process of this invention.

It is particularly preferred where a mixture of straight-chain and branched-chain hydrocarbons boiling in the $C_5$ to $C_6$ range is used as one feed that the other feed consists essentially of normal butane. Normal butane is an excellent desorption fluid for desorbing adsorbed normal pentane and hexane from the sieve material. Further, the butane is readily displaced from the sieve by the $C_5$ to $C_6$ fraction as a subsequent feed. The products obtained are readily separable by distillation in that normal butane is readily distillable from the resulting mixture of normal butane, normal isopentanes and isohexanes.

FIGURE I illustrates a schematic flow diagram for carrying out an embodiment of this invention.

FIGURE II illustrates the zones of adsorption and desorption within the molecular sieve bed as utilized in the specific embodiment of FIGURE I.

With reference to FIGURE I of the drawing, normal butane is charged through line 11, switch valve 13 and line 14 through adsorber 15 whereby normal butane is adsorbed upon the adsorbent material within adsorber 15. The adsorber material within adsorber 15 is Linde Molecular Sieve Type 5A in pellet form (clay binder). During charging of n-butane, the adsorber may conveniently be vented through line 16, valve 25, line 17, valve 18, line 21, storage tank 22 and valved line 24. Charging of n-butane is at a temperature of about 400° F. in the vapor phase. The molecular sieve bed in adsorber 15 is now loaded in the pores within the sieve and in the voids around the sieve material with normal butane as depicted in FIGURE IIa. Switch valve 13 is then turned to cut off flow of normal butane and permit flow of a mixture of normal and isopentanes from line 12 through line 14 and into adsorber 15, the pentanes are at 400° F., the pentane feed establishes a mass transfer front within the molecular sieve bed and the composition of the hydrocarbons within the bed is as illustrated in FIGURE IIb. The mass transfer front A in FIGURE IIb moves through the molecular sieve material and normal butane is desorbed preceding the front while normal pentane is adsorbed from feed in the voids behind the front. Isopentane left from adsorption of normal pentane from the feed in the voids travels through the bed and becomes admixed with normal butane in the voids in front of mass transfer front A and within the area between mass transfer front A and line B. Line B illustrates a sharp line of demarcation between normal butane and the mixture of normal butane and isopentane.

Again with reference to FIGURE I during charging of the feed, valves 25 and 18 are maintained in open position and valved line 24 is closed to provide recycle of normal butane through lines 17 and 21 to storage tank 22 from which normal butane may be withdrawn for reuse through line 23. If it is desired to remove excess butane, this may be done through valved line 24. As more pentanes are charged to adsorber 15, the normal butane is displaced and carried from the adsorption bed. FIGURE IIc illustrates the composition within adsorber 15 as more pentanes are charged. When line B reaches the outlet end of the bed, i.e., when isopentanes are detected in line 16, valve 25 is closed and valve 26 is opened to permit charging of the mixture of isopentane and normal butane coming from the outlet of the molecular sieve to fractionator 32 wherein normal butane is recovered as an overhead and recycled through lines 33 and 21 to storage tank 22. The isopentane bottoms fraction from fractionator 32 is recovered through line 34 as a product. The isopentane product is particularly useful as a blending stock for high-octane motor fuels.

In FIGURE IIc with additional charging of feed, mass transfer front A moves through the bed. Before mass transfer front A reaches the outlet end of the bed, switch valve 13 is turned to cut off flow of pentane feed and permit flow of normal butane feed from line 11 through line 14 into adsorber 15. The normal butane flowing through adsorber 15 creates another mass transfer front indicated as C in FIGURE IId, and as this mass transfer front moves through the bed, normal pentanes are displaced from the sieve in front of the mass transfer front and normal butane is adsorbed behind the front. In the meantime, the feed zone in the voids is moving toward the outlet and is decreasing in size due to adsorption of normal pentane onto the sieve material. In FIGURE IIe additional normal butane feed has been charged to the adsorber and all zones have moved toward the outlet, the feed zone in the voids having further decreased in size. It is preferred that this feed zone in the voids, which continually decreases in size as it moves toward the outlet, disappears before it gets to the outlet.

Now turning back to FIGURE I with additional charging of normal butane, mass transfer front C moves toward the outlet of the bed, and when this mass transfer front passes the point of introduction of line 42 at the side of adsorber 15, switch valve 13 is turned to permit cut off of normal butane feed and permit charging of butane feed. Valve 41 is then opened and normal butane is charged from the side of adsorber 15 to expand the normal butane zone within the adsorber behind mass transfer front C as illustrated. In FIGURE IIf, as additional pentanes feed is charged, the composition of the sieve material and voids is as illustrated in FIGURE IId. Continual charging of pentanes and subsequent switching to normal butane feed repeats the bed compositions illustrated in FIGURE IIc through IIe.

While charging n-butane through line 42 in FIGURE I, the mixture of n-butane and n-pentane created in front of mass transfer front C of FIGURE IIe proceeds to the end of the adsorber bed and is removed through line 16. Valve 26 is closed and valve 28 is opened permitting flow of the normal butane and normal pentane mixture to fractionator 35. A normal butane overhead is recovered through line 36 and charged to line 33 and finally to storage tank 22. The bottoms fraction from fractionator 35 is normal pentane and is recovered through line 37. The normal butane is of excellent purity and is useful as a solvent, e.g., in demetallization of reduced crudes.

The above example is a continuous process and proceeds by alternating the two feeds to the adsorber and alternating products withdrawn through line 16 to different processing equipment as illustrated.

In the above example with reference to the figures, the adsorption bed was maintained sufficiently above atmospheric pressure to maintain all components within adsorber 15 in the liquid state. Adsorption and desorption is carried out at essentially the same pressure conditions. Space velocities of feeds to the above example are in the range of 0.05 to 10 cu. ft. of feed per hour per cu. ft. of bed material. More specifically, the pentanes are charged at a velocity of one cu. ft. per hour per cu. ft. of bed material, and the normal butane is charged at a space velocity of 4 cu. ft. per hour per cu. ft. of bed material.

Where operation is in the vapor phase, adsorption and desorption are also preferably carried out at higher than atmospheric pressures in order to allow the fractionator overheads to be condensed with cooling water.

The thickness of all of the mass transfer fronts in a molecular sieve bed at a given time is a function of the efficiency of the molecular sieve adsorption system at that time. The efficiency may be measured as follows:

$$\text{Efficiency} = \frac{W}{L}$$

wherein W is the thickness of all of the mass transfer fronts present and L is the length of the molecular sieve bed. This efficiency may conveniently be expressed in percentage. For example, assuming a mass transfer front thickness of 2 feet and a bed length of 20 feet, where one mass transfer front is present in the bed, the efficiency by this calculation is 10%. Similarly where two mass transfer fronts are moving through the bed, the efficiency is 20% and where three mass transfer fronts are moving through the bed the efficiency is 30%. Adsorption and desorption take place at the mass transfer fronts and, thus, the mass transfer front represents the portion of the molecular sieve material which is undergoing adsorption and desorption at an efficient rate. It is evident that the greater number of mass transfer fronts moving through a bed, assuming a constant thickness of mass transfer fronts, the more efficient the operation. The process of this invention increases efficiency by simultaneous adsorption and desorption utilizing more than one mass transfer front passing through the bed at one time during the process.

The rate of flow and frequency of alternating the feeds to the adsorption zone may advantageously be controlled or adjusted to further increase efficiency of the molecular sieve material. Accordingly, amounts of feed charged per alternating charging and the rate of charging of separable feed may be controlled to provide disappearance of the zone of separable feed in the voids before such feed zone travels to the outlet end of the molecular sieve bed. Such adjustment of rates of flow and amounts of feed can best be made by experimentation, i.e., by determining breakthrough from the outlet end of the bed of a composition zone corresponding to the composition of the separable feed material. Of course, where both feeds used are separable feeds, then efficiency is maximized by adjusting feed flows and amounts so that both feed zones in the voids of the adsorbent bed disappear near the outlet of the bed but prior thereto.

Relative adsorptivities of the normal hydrocarbons in the two feed materials may also be taken into consideration where it is desired to maximize efficiency of the adsorption and desorption, particularly where the feeds are both separable feeds, i.e., both feeds contain straight-chain hydrocarbons and nonstraight-chain hydrocarbons. (Liquid phase relative adsorptivities for any two adsorbable compounds may conveniently be estimated by dividing the vapor phase relative adsorptivity of these two compounds by the relative volatility of these two compounds.) Efficiency may be increased by employing feed containing normal hydrocarbons of closer relative adsorptivities in that approximate mole for mole displacement may be achieved at the mass transfer fronts where the ratio of relative adsorptivities approaches unity. Greater efficiency in use of equipment may be attained where feeds of closer relative adsorptivities are used. It follows then that efficiency may be maximized by selection of feeds. It has been found that, as two normal hydrocarbons approach each other in chain lengths, the relative adsorptivity of this pair becomes smaller. Therefore, in order to obtain an increase in efficiency by selection of feeds, it is desirable to pick materials as feeds which have about the same chain length. However, as pointed out above, it is desirable that the feeds be sufficiently different boiling to permit recovery of products by distillation.

In the embodiment of this invention wherein two separable feeds are each to be separated, in liquid phase operation mass-transfer resistance may be expected to cause difficulties in operation. These difficulties may conveniently be lessened by any one or combination of the following procedures: (1) Decreasing the space velocity of feeds charged through the bed, and/or (2) using smaller molecular sieve particle sizes in the molecular sieve bed. Increasing the temperature of the feeds charged through the bed may also serve to lessen mass-transfer resistance in liquid phase operation. Where only one of the feeds is to be separated and the other is used merely as a displacing fluid, problems arising from mass-transfer resistance may not be serious because the feed used solely as a displacement or desorption fluid can be charged through the bed in greater quantities until mass transfer with adsorbed normal paraffins separated from the other feed is completed. The rate of charging such desorption fluid type feed may be increased if desired using an inlet at the side of the adsorbent bed as discussed with regard to one preferred embodiment above. Also, the procedures mentioned above with regard to lessening mass transfer problems where two separable feeds are used may also be used in this instance.

It is evident from the foregoing that we have provided an improved method for utilizing molecular sieve adsorbents in separation of hydrocarbons. The method of this invention employs uni-directional flow for each feed charged through the bed and, in the process, more than one mass transfer front passes through the bed at the same time. This utilizes a greater amount of molecular sieve material in the bed for mass transfer and provides simultaneous adsorption and desorption.

We claim:

1. A process for separating straight-chain hydrocarbons from a mixture comprising straight-chain hydrocarbons and non-straight-chain hydrocarbons which process comprises charging said mixture through a bed of molecular sieve adsorbent material having pore sizes of about 5 A. from an inlet end to an outlet end of said bed in the liquid state whereby straight-chain hydrocarbons from said mixture are adsorbed, thereafter charging a different boiling straight-chain hydrocarbon through said bed from said inlet to said outlet end in the liquid state thereby creating a first mass transfer front and straight-chain hydrocarbons from said mixture are desorbed from said bed preceding said first front and said different boiling straight-chain hydrocarbon adsorbed on said bed behind said first front recovering a first effluent from said bed comprising a mixture of said different boiling straight-chain hydrocarbon and said desorbed straight-chain hydrocarbons from said mixture, fractionating said first effluent into a first product consisting of said different boiling straight-chain hydrocarbon and a product consisting of said straight chain hydrocarbons from said mixture, charging additional said mixture through said bed from said inlet to said outlet thereby creating a second mass transfer front preceding said mixture to said bed and the adsorbed different boiling straight-chain hydrocarbon is desorbed before said second front and straight-chain hydrocarbons from said mixture are adsorbed behind said second front, recovering a second effluent consisting of said desorbed different boiling straight-chain hydrocarbon and said non-straight-chain hydrocarbons from said mixture from the outlet of said bed, fractionating said second effluent into a second different boiling straight-chain hydrocarbon fraction and as a product non-straight-chain hydrocarbon from said mixture, charging additional said different boiling straight-chain hydrocarbon through said bed from said inlet to said outlet before second mass transfer front passes completely through said bed, alternating the charging of said mixture and said different boiling straight-chain hydrocarbon through said bed from said inlet to said outlet thereby creating mass transfer fronts within said bed and preceding each charging of said mixture and said different boiling straight-chain hydrocarbon through said bed thereby desorbing of adsorbed hydrocarbon occurs before each front and adsorbing charged straight-chain hydrocarbon occurs behind each front, recycling said different boiling straight-chain hydrocarbon from said fractioning steps to the different boiling straight-chain hydrocarbons charge, and controlling the amount of said mixture charged in each charging of said mixture through said bed so that the amounts of said mixture in each charging are less than those amounts sufficient to provide passage of said mixture through said bed in the same composition as charged at said inlet.

2. A process for separating straight-chain hydrocarbons from a mixture comprising a straight-chain hydrocarbon and a nonstraight-chain hydrocarbon, which process comprises charging a different boiling straight-chain hydrocarbon through the same bed of molecular sieve adsorbent having pore sizes of about 5 A. whereby said different boiling straight-chain hydrocarbon is adsorbed in the liquid state within the pores of said molecular sieve adsorbent, thereafter charging a portion of said mixture through said bed in the liquid state in the same direction as the charging of said different boiling straight-chain hydrocarbon thereby creating a first mass transfer front within said bed preceding said mixture through said bed, thereafter and before said first mass transfer front travels completely through said bed charging additional said different boiling straight-chain hydrocarbon through said bed in said same direction thereby creating a second mass transfer front within said bed preceding said additional different boiling straight-chain hydrocarbon through said bed, charging additional said different boiling straight-chain hydrocarbon from the side of said bed and into the portion of said bed behind said second mass transfer front but in front of the next subsequent mass transfer front preceding the next subsequent portion of said mixture charging through said bed, and thereafter alternating the chargings of portions of said mixture and said different boiling straight-chain hydrocarbon through said bed to provide charging of said different boiling straight-chain hydrocarbon subsequent to charging of said mixture and in the same direction of flow as said mixture before the mass transfer front preceding said mixture passes completely through the length of said bed and said side of bed charging of said additional different boiling straight-chain hydrocarbon behind the mass transfer front preceding each of the alternate charging of portions of said different boiling straight-chain hydrocarbon in the same direction as the charging of said mixture.

3. A process for separating normal pentane from a mixture of normal pentane and isopentanes which process comprises charging said mixture through a bed of molecular sieve adsorbent material having pore sizes of about 5 A. from an inlet end to an outlet end of said bed in the liquid state whereby normal pentane is adsorbed, thereafter charging n-butane through said bed from said inlet to said outlet end in the liquid state thereby creating a first mass transfer front and normal pentane is desorbed from said bed preceding said first front and normal butane is adsorbed on said bed behind said first front recovering a first effluent from said bed comprising a mixture of normal butane and normal pentane, fractionating said first effluent into a first normal butane and a normal pentane product, charging additional said mixture through said bed from said inlet to said outlet thereby creating a second mass transfer front preceding said mixture to said bed and normal butane is desorbed before said second front and n-pentane is adsorbed behind said second front, recovering a second effluent consisting of normal butane and isopentanes from the outlet of said bed, fractionating said second effluent into a second normal butane fraction and an isopentanes product, charging additional normal butane through said bed from said inlet to said outlet before said second mass transfer front passes completely through said bed, alternating the charging of said mixture and normal butane through said bed from said inlet to said outlet thereby creating mass transfer fronts within said bed and preceding each charging of said mixture and said normal butane through said bed thereby desorbing adsorbed hydrocarbon occurs before each front and adsorbing charged straight-chain hydrocarbon occurs behind each front, recycling normal butane from said fractionating steps to the normal butane charge, and controlling the amount of said mixture charged in each charging of said mixture through said bed so that the amounts of said mixture in each charging are less than those amounts sufficient to provide passage of said mixture through said bed in the same composition as charged at said inlet.

References Cited by the Examiner
UNITED STATES PATENTS

| | | | |
|---|---|---|---|
| 2,920,037 | 1/60 | Haensel | 208—310 |
| 2,921,026 | 1/60 | Fleck et al. | 208—310 |
| 3,054,838 | 9/62 | Egan | 206—676 |

ALPHONSO D. SULLIVAN, *Primary Examiner.*

JAMES S. BAILEY, JOSEPH R. LIBERMAN,
*Examiners.*